UNITED STATES PATENT OFFICE.

AUGUST BLANK AND WILHELM BERGDOLT, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

AZO DYES.

1,087,429. Specification of Letters Patent. Patented Feb. 17, 1914.

No Drawing. Application filed March 28, 1913. Serial No. 757,350.

*To all whom it may concern:*

Be it known that we, AUGUST BLANK and WILHELM BERGDOLT, doctors of philosophy, chemists, citizens of the German Empire, residing at Leverkusen, near Cologne-on-the-Rhine, Germany, have invented new and useful Improvements in Azo Dyes, of which the following is a specification.

Our invention relates to the manufacture and production of new blue azo dyestuffs suitable for dyeing half-wool which are distinguished by the valuable property that they dye cotton an intense shade, whereas they leave the wool almost untinged in a neutral dye-bath. The dyeing is carried out in the usual way with an addition of Glauber's salt. The colors dye easily level.

Most of the half-wool or substantive blues hitherto known display the tendency, on being worked for an extended time at the boil, to dye the wool a deeper shade than the cotton. This is a decided drawback for the dyeing of the half-wool and can be overcome only by regulating the temperature most carefully. This disadvantage is excluded by the use of our new dyes, which always dye the cotton considerably deeper than the wool even when the boiling is continued for a long time, so that the wool can easily be shaded as desired with suitable neutral-dyeing colors.

The process for producing our new dyes consists in combining a tetrazotized paradiamin, such as para-phenylenediamin, dianisidin, or para-diaminoazo compounds, such as the tetrazotized intermediate product obtained by the combination of one molecule of diazotized para-amino-acetanilid with one molecule of a naphthylamin sulfonic acid and subsequent saponification with the urea of 2-naphthylamin-5-oxy-7-sulfonic acid.

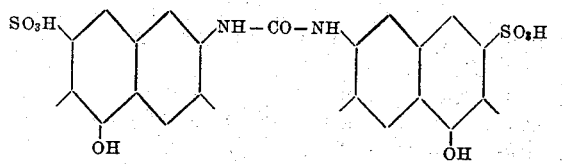

and one molecule of a 1.8-dioxynaphthalene sulfonic acid.

The new azo coloring matters are in the shape of their alkalin salts after being dried and pulverized dark powders soluble in water with a blue coloration. Upon reduction with stannous chlorid and hydrochloric acid a para-diamin, 1.8-dioxy-2-naphthylamin-sulfonic acid and the mixed urea of 6-amino-5-oxy-2-naphthylamin-7-sulfonic acid and 2.5.7-aminonaphthol sulfonic acid are obtained. They dye cotton, silk, artificial silk and half-silk or half-wool blue shades, when applied on the two last mentioned materials they leave the wool or silk almost untinged.

In order to illustrate the new process more fully the following example is given, the parts being by weight:—43.9 parts of the azo dye obtained from diazotized para-aminoacetanilid and 1.8-dioxynaphthalene-3.6-disulfonic acid from which the acetyl group is split off are diazotized with hydrochloric acid and 6.9 parts of sodium nitrite. The resulting diazo compound is then added to a solution of 50.4 parts of the urea of 2-naphthylamin-5-oxy-7-sulfonic acid containing 80 parts of soda, the mixture is stirred during 12 hours, heated to 75° C. and the dye is precipitated with common salt. It dyes cotton pure greenish-blue shades. It is after being dried and pulverized in the shape of its sodium salt a dark powder soluble in water with a blue color and yielding upon reduction with stannous chlorid and hydrochloric acid para-phenylenediamin, 1.8-dioxy-2-naphthylamin-3.6-disulfonic acid and the mixed urea of 6-amino-5-oxy-2-naphthylamin-7-sulfonic acid and 2.5.7-aminonaphthol-sulfonic acid. It has most probably the formula (free acid):

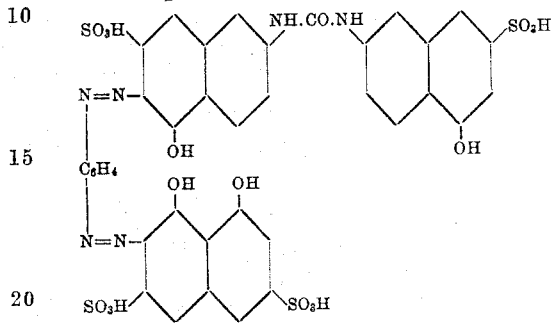

Other 1.8-dioxynaphthalene-sulfonic acids, such as the 4-monosulfonic acid may be used.

We claim:—

1. The herein described new azo dyestuffs, which are in the shape of their alkaline salts, after being dried and pulverized, dark powders soluble in water with a blue coloration; yielding upon reduction with stannous chlorid and hydrochloric acid a para-diamin, a 1.8-dioxy-2-naphthylamin sulfonic acid and the mixed urea of 6-amino-5-oxy-2-naphthylamin-7-sulfonic acid and 2.5.7-aminonaphthol sulfonic acid; dyeing cotton, silk, artificial silk, half-silk and half-wool blue shades and being distinguished by the valuable property that on dyeing half-wool they dye cotton an intense shade, whereas they leave the wool almost untinged in a neutral dye-bath, substantially as described.

2. The herein described new azo dyestuff having most probably the formula:

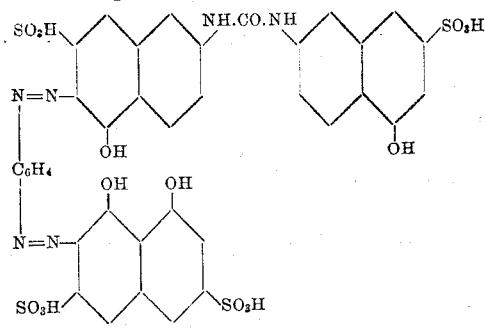

which is after being dried and pulverized in the shape of its sodium salt a dark powder soluble in water with a blue color; yielding upon reduction with stannous chlorid and hydrochloric acid para-phenylenediamin. 1.8-dioxy-2-naphthylamin-3.6-disulfonic acid and the mixed urea of 6-amino-5-oxy-2-naphthylamin-7-sulfonic acid and 2.5.7-aminonaphthol sulfonic acid; and dyeing cotton in pure greenish-blue shades, substantially as described.

In testimony whereof we have hereunto set our hands in the presence of two subscribing witnesses.

AUGUST BLANK. [L. S.]
WILHELM BERGDOLT. [L. S.]

Witnesses:
 HELEN NUFER,
 ALBERT NUFER.

---

Copies of this patent may be obtained for five cents each, by addressing the "Commissioner of Patents, Washington, D. C."